(12) United States Patent
Kaneko et al.

(10) Patent No.: US 9,573,542 B2
(45) Date of Patent: Feb. 21, 2017

(54) BUMPER REINFORCEMENT

(71) Applicants: AISIN SEIKI KABUSHIKI KAISHA, Kariya-shi, Aichi-ken (JP); AISIN KEIKINZOKU KABUSHIKI KAISHA, Imizu-shi, Toyama-ken (JP)

(72) Inventors: Takanobu Kaneko, Kariya (JP); Jun Shobo, Anjo (JP); Kazutaka Mori, Anjo (JP)

(73) Assignees: Aisin Seiki Kabushiki Kaisha, Kariya-shi, Aichi-ken (JP); Aisin Keikinzoku Kabushiki Kaisha, Imizu-shi, Toyama-ken (JP)

( * ) Notice: Subject to any disclaimer, the term of this patent is extended or adjusted under 35 U.S.C. 154(b) by 0 days.

(21) Appl. No.: 14/666,255

(22) Filed: Mar. 23, 2015

(65) Prior Publication Data

US 2015/0274101 A1   Oct. 1, 2015

(30) Foreign Application Priority Data

Mar. 26, 2014   (JP) ................................. 2014-63028

(51) Int. Cl.
*B60R 19/18* (2006.01)
*B60R 19/24* (2006.01)

(52) U.S. Cl.
CPC .............. *B60R 19/18* (2013.01); *B60R 19/24* (2013.01); *B60R 2019/182* (2013.01); *B60R 2019/1813* (2013.01); *B60R 2019/247* (2013.01)

(58) Field of Classification Search
CPC ....... B21C 23/08; B21C 23/085; B21C 35/02; B21C 35/023; B21C 35/026; B21C 35/04;
(Continued)

(56) References Cited

U.S. PATENT DOCUMENTS 5,078,439 A * 1/1992 Terada ................... B60R 19/18
                                                    293/109
5,404,974 A * 4/1995 Thum ..................... F16F 7/123
                                                    188/372

(Continued)

FOREIGN PATENT DOCUMENTS

DE       19533366 A1 *  3/1997  ............. B60R 19/34
DE       19611934 C1 *  4/1997  ............. B60R 19/04

(Continued)

OTHER PUBLICATIONS

European Search Report from EPO Application 15161155.5-1503, dated Jul. 30, 2015.
(Continued)

*Primary Examiner* — Glenn Dayoan
*Assistant Examiner* — Paul Chenevert
(74) *Attorney, Agent, or Firm* — Finnegan, Henderson, Farabow, Garrett & Dunner, LLP

(57) ABSTRACT

Provided is a bumper reinforcement to be mounted to side members arranged at both end portions of a vehicle in a vehicle width direction so as to extend in a vehicle front-and-rear direction, the bumper reinforcement including: a body section formed into a tubular shape so as to extend in the vehicle width direction of the vehicle, the body section having both end portions in the vehicle width direction, which are formed so as to extend in the vehicle width direction, and an intermediate portion in the vehicle width direction, which is formed in a protruding manner toward one of a front of the vehicle and a rear of the vehicle; and a mounting section to be mounted to one of a front end surface and a rear end surface of each of the side members, the mounting section being formed into a tubular shape extending in the vehicle width direction integrally with a side surface portion of each of the both end portions of the (Continued)

body section in the vehicle width direction, the side surface portion being opposed to the each of the side members.

4 Claims, 4 Drawing Sheets

(58) Field of Classification Search
CPC ......... B60R 19/18; B60R 19/24; B60R 19/26; B60R 19/34; B60R 2019/1813; B60R 2019/182; B60R 2019/247
See application file for complete search history.

(56) References Cited

U.S. PATENT DOCUMENTS

| | | | | |
|---|---|---|---|---|
| 5,727,826 A * | 3/1998 | Frank | ........................ | B60J 5/042 293/102 |
| 5,772,267 A * | 6/1998 | Heim | ........................ | B60R 19/34 293/132 |
| 5,788,297 A * | 8/1998 | Sugawara | ................ | B60R 19/18 293/102 |
| 6,059,331 A * | 5/2000 | Mori | ........................ | B60R 19/18 293/132 |
| 6,467,831 B1 * | 10/2002 | Mori | ........................ | B60R 19/18 293/102 |
| 6,481,690 B2 * | 11/2002 | Kariatsumari | .......... | B60R 19/18 293/102 |
| 6,705,653 B2 * | 3/2004 | Gotanda | ................. | B60R 19/34 293/132 |
| 6,729,682 B2 * | 5/2004 | Delavalle | ............... | B62D 25/08 296/193.08 |
| 6,808,215 B2 * | 10/2004 | Sakuma | .................. | B60R 19/34 293/102 |
| 6,908,130 B2 * | 6/2005 | Reutlinger | .............. | B60R 19/18 293/102 |
| 6,913,300 B2 * | 7/2005 | Mori | ........................ | B60R 19/18 293/120 |
| 7,066,525 B2 * | 6/2006 | Jaeger | ..................... | B60R 19/18 293/120 |
| 7,354,030 B2 * | 4/2008 | Murayama | .............. | B60R 19/18 267/140 |
| 7,537,252 B2 * | 5/2009 | Nagai | ..................... | B60R 19/18 293/102 |
| 7,931,315 B2 * | 4/2011 | Hori | ........................ | B60R 19/18 293/102 |
| 8,052,184 B2 * | 11/2011 | Braunbeck | .............. | B60R 19/34 293/132 |
| 8,317,238 B2 * | 11/2012 | Haneda | ................ | B21D 39/032 293/117 |
| 8,500,939 B2 * | 8/2013 | Nimkar | ............... | A61M 25/001 128/898 |
| 8,864,196 B2 * | 10/2014 | Shamoto | ................. | B60R 19/18 293/107 |
| 9,033,398 B2 * | 5/2015 | Verbrugge | ............ | B21C 23/085 296/187.03 |
| 9,102,289 B2 * | 8/2015 | Braunbeck | .............. | B60R 19/34 |
| 9,156,417 B2 * | 10/2015 | Mori | ....................... | B60R 19/34 |
| 9,233,656 B2 * | 1/2016 | Kil | ........................... | B60R 19/03 |
| 2004/0164566 A1 | 8/2004 | Jaeger et al. | | |
| 2007/0039282 A1 * | 2/2007 | Holl | ........................ | B60R 19/18 52/843 |
| 2007/0246956 A1 | 10/2007 | Nagai et al. | | |
| 2007/0257497 A1 * | 11/2007 | Heatherington | ........ | B60R 19/18 293/120 |
| 2008/0012364 A1 * | 1/2008 | Boggess | ................ | B60R 19/18 293/120 |
| 2009/0152881 A1 * | 6/2009 | Shin | ........................ | B60R 19/18 293/102 |
| 2011/0109122 A1 * | 5/2011 | Clausen | ................. | B60R 19/12 296/187.03 |
| 2012/0126553 A1 * | 5/2012 | Mildner | ................. | B60R 19/04 293/102 |
| 2016/0121826 A1 * | 5/2016 | Terada | .................... | B60R 19/18 293/102 |

FOREIGN PATENT DOCUMENTS

| | | | | |
|---|---|---|---|---|
| DE | 19603958 A1 * | 8/1997 | ............. | B60R 19/04 |
| DE | 19847389 A1 * | 4/2000 | ............. | B60R 19/24 |
| DE | 10239919 A1 * | 2/2004 | ............. | B60R 19/18 |
| DE | 102005031728 A1 * | 7/2006 | ........... | B62D 21/152 |
| DE | 10 2008-029634 A1 | 8/2009 | | |
| DE | 102008039513 A1 * | 2/2010 | ............. | B60R 19/56 |
| DE | 102008057881 A1 * | 5/2010 | ............. | B60R 19/18 |
| DE | 10 2011-004197 A1 | 8/2012 | | |
| DE | 102014011426 A1 * | 7/2015 | ............. | B62D 21/15 |
| FR | 2741413 A1 * | 5/1997 | ............. | B60R 19/18 |
| JP | 2002-12104 A | 1/2002 | | |
| JP | 2007-176487 A | 7/2007 | | |
| JP | 2008-201417 A | 9/2008 | | |
| JP | 2010-89775 A | 4/2010 | | |
| JP | 4460679 B2 * | 5/2010 | ........... | B21C 35/023 |
| WO | WO 03080398 A1 * | 10/2003 | ............. | B60R 19/18 |
| WO | WO 2009093914 A1 * | 7/2009 | ............. | B60R 19/18 |
| WO | WO 2015145799 A1 * | 10/2015 | ............. | B60R 19/18 |
| WO | WO 2015145835 A1 * | 10/2015 | ............. | B60R 19/18 |

OTHER PUBLICATIONS

EPO communication for EP application No. 15 161 155.5—1503 dated Nov. 28, 2016.

* cited by examiner

BUMPER REINFORCEMENT

CROSS REFERENCE TO RELATED APPLICATIONS

This application is based on and claims priority under 35 U.S.C. §119 to Japanese Patent Application 2014-63028, filed on Mar. 26, 2014, the entire content of which is incorporated herein by reference.

TECHNICAL FIELD

The present disclosure relates to a bumper reinforcement of a vehicle.

BACKGROUND DISCUSSION

Hitherto, as disclosed in Japanese Patent Application Laid-open No. 2007-176487, there has been known a bumper device for absorbing shock caused when a vehicle collides. The bumper device includes a bumper reinforcement formed so as to extend in a vehicle width direction.

The related-art bumper reinforcement is mounted to side members through intermediation of bumper stays. In other words, the bumper reinforcement is fastened to the bumper stays with bolts and nuts, and the bumper stays are fastened to the respective side members with bolts and nuts. The fastening portions between the components are regarded as a factor in reducing body rigidity of the vehicle. Therefore, in order to increase the body rigidity of the vehicle, it is desired that the number of the above-mentioned fastening portions between the components be minimized.

SUMMARY

A need thus exists for a bumper reinforcement which is not susceptible to the drawback mentioned above. Note that, in the following description of respective components of the present disclosure, for the sake of better understanding of the present disclosure, the respective components are denoted by parenthesized reference symbols that represent corresponding components according to an embodiment of the present disclosure. However, the respective components of the present disclosure should not be limitedly construed by configurations of the corresponding components denoted by the reference symbols of the embodiment.

In order to achieve the above-mentioned object, the present disclosure has a feature in a bumper reinforcement (10) to be mounted to side members (SL, SR) arranged at both end portions of a vehicle in a vehicle width direction so as to extend in a vehicle front-and-rear direction, the bumper reinforcement (10) including: a body section (20) formed into a tubular shape so as to extend in the vehicle width direction of the vehicle, the body section (20) having both end portions in the vehicle width direction, which are formed so as to extend in the vehicle width direction, and an intermediate portion in the vehicle width direction, which is formed in a protruding manner toward one of a front of the vehicle and a rear of the vehicle; and a mounting section (30) to be mounted to one of a front end surface and a rear end surface of each of the side members, the mounting section (30) being formed into a tubular shape extending in the vehicle width direction integrally with a side surface portion of each of the both end portions of the body section in the vehicle width direction, the side surface portion being opposed to each of the side members.

DETAILED DESCRIPTION

Figure 1:
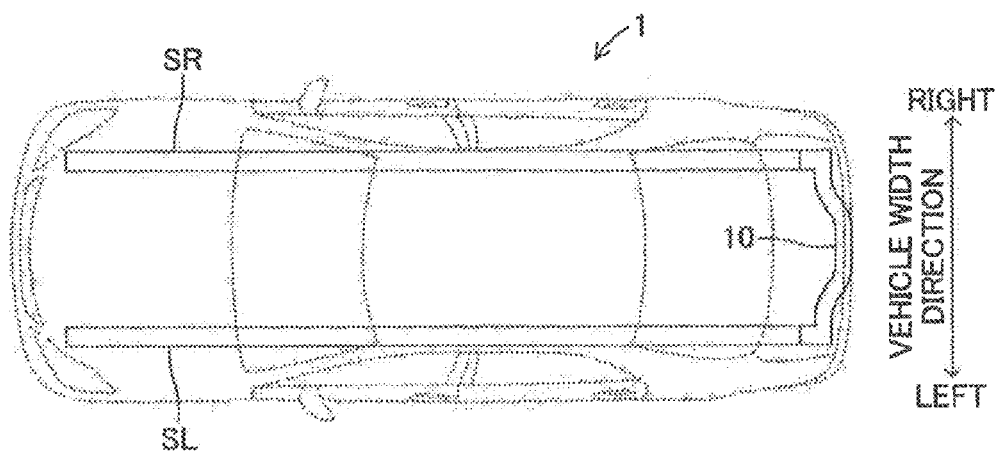
FIG. 1 is a schematic top view illustrating a vehicle to which a bumper reinforcement according to an embodiment of the present disclosure is applied.

A bumper reinforcement 10 according to an embodiment of the present disclosure is described. First, brief description is made of a configuration of a vehicle 1 to which the bumper reinforcement 10 is mounted. As illustrated in FIG. 1, the vehicle 1 includes a pair of left and right side members SL, SR arranged with an interval in a vehicle width direction so as to extend in a vehicle front-and-rear direction. Each of the side members SL, SR is arranged at a position distanced by about a quarter of a vehicle width from a left end or a right end of the vehicle 1 in the vehicle width direction. The side members SL, SR are each formed into a tubular shape so as to extend in the vehicle front-and-rear direction, and a rear end surface of each of the side members SL, SR is closed by a rear wall portion. A rear end surface of the rear wall portion is formed into a flat surface perpendicular to the vehicle front-and-rear direction. A through-hole, into which a bolt for fastening the bumper reinforcement 10 is inserted, is formed in the rear wall portion. A nut for fastening the bolt is fitted into the through-hole. The bumper reinforcement 10 is formed so as to extend in the vehicle width direction, and both end portions of the bumper reinforcement 10 in the vehicle width direction are mounted to end surfaces of the side members SL, SR in the vehicle front-and-rear direction, respectively. Note that, in this embodiment, the bumper reinforcement 10 is described as a member to be mounted to a rear end portion of the vehicle, but the present disclosure is also applicable to a bumper reinforcement to be mounted to a front end portion of the vehicle. Further, FIG. 3 illustrates only a right end portion of a rear of the vehicle 1 in the vehicle width direction, A left end portion of the rear of the vehicle 1 in the vehicle width direction is symmetrical with the right end portion in the vehicle width direction, and hence description thereof is omitted as appropriate.

Figure 2:
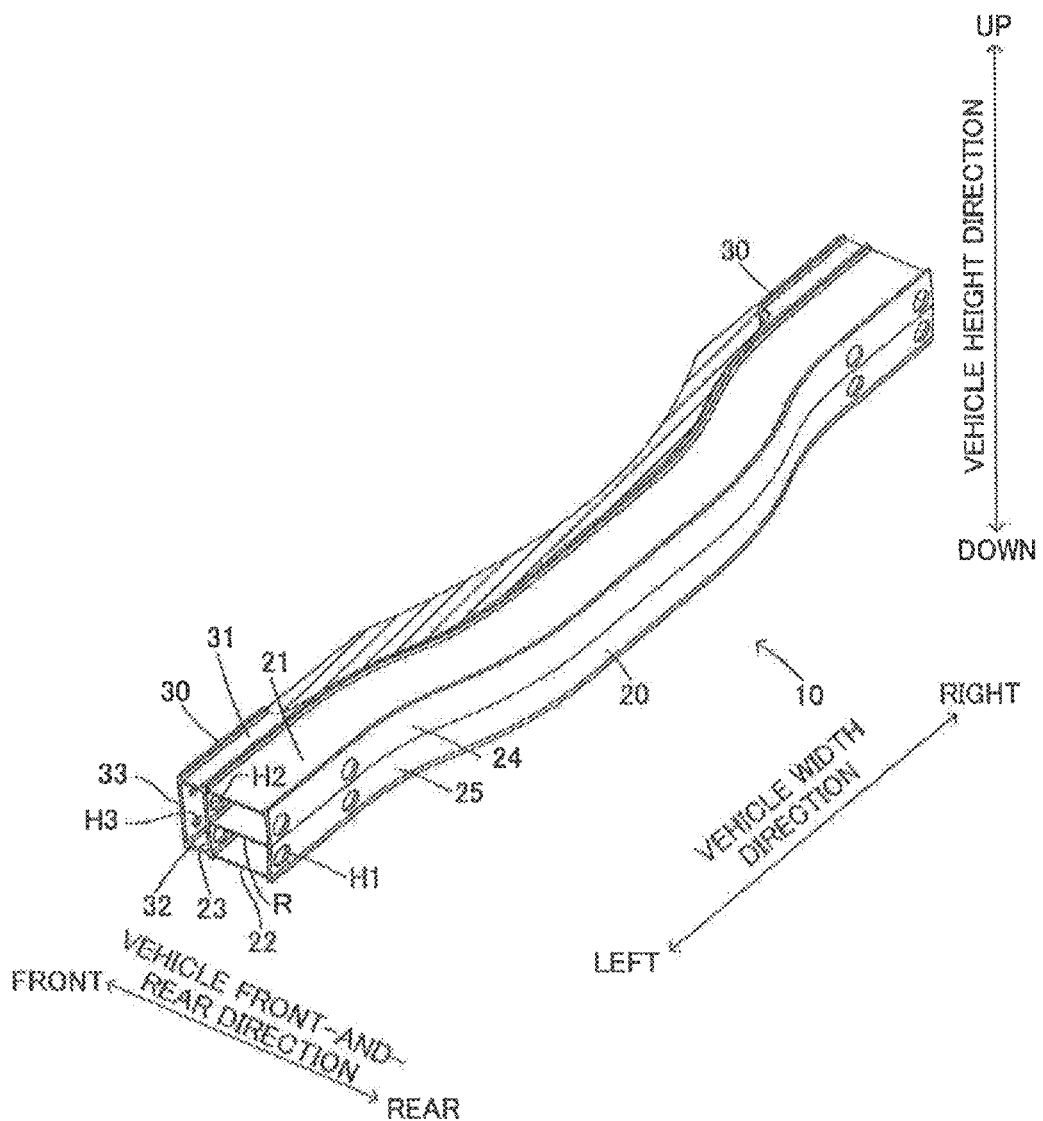
FIG. 2 is a perspective view illustrating the bumper reinforcement of FIG. 1.
Figure 3:
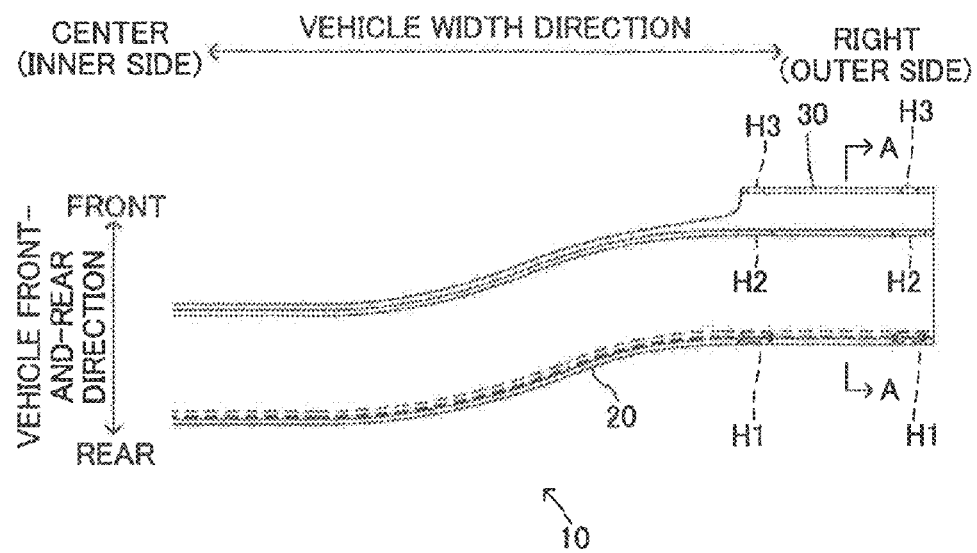
FIG. 3 is an enlarged top view illustrating a right end portion of the bumper reinforcement of FIG. 1.
Figure 4:
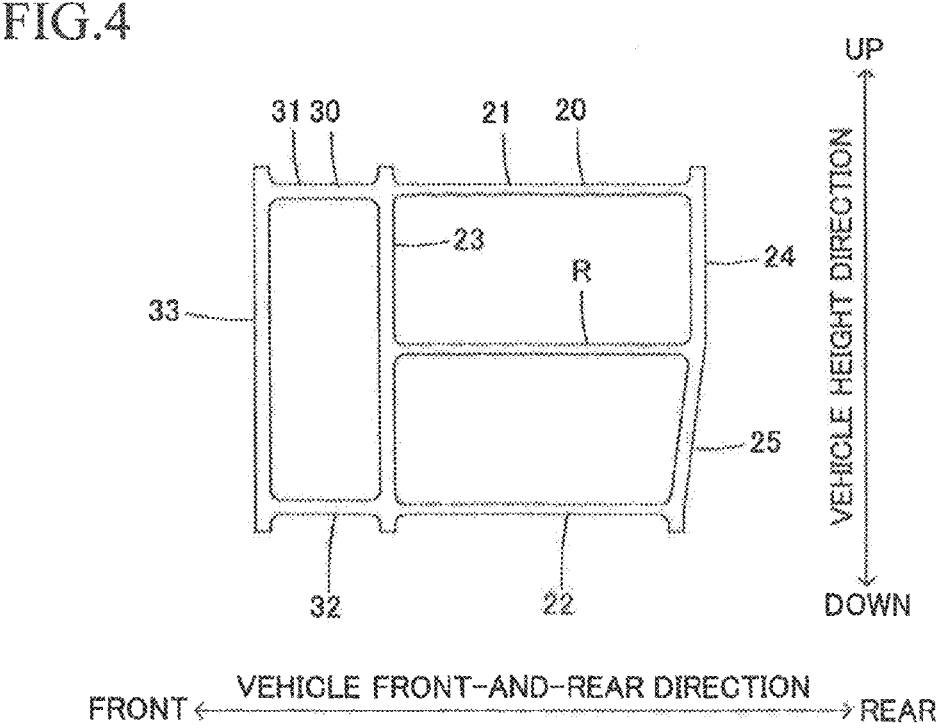
FIG. 4 is a cross-sectional view taken along the arrow A-A of FIG. 3.

As illustrated in FIGS. 2 and 3, the bumper reinforcement 10 includes a body section 20 formed into a tubular shape extending in the vehicle width direction, and mounting sections 30, 30. An intermediate portion of the body section 20 in the vehicle width direction is formed so as to be curved along a bumper cover of the vehicle 1. In other words, the intermediate portion of the body section 20 including a center portion thereof in the vehicle width direction is curved so that an outer side of the intermediate portion in the vehicle width direction is positioned slightly forward of an inner side of the intermediate portion in the vehicle width direction in top view. Both end portions of the body section 20 in the vehicle width direction are formed so as to extend linearly in parallel to the vehicle width direction. As illustrated in FIG. 4, a cross-sectional profile of the body section 20 taken along a direction perpendicular to an extending direction of the body section 20 exhibits substantially a pentagon. That is, the body section 20 includes an upper wall portion 21 and a lower wall portion 22 each formed into a plate-like shape so as to be perpendicular to a vehicle height direction (in other words, an upper surface and a lower surface of the body section 20 are arranged so as to be horizontal). The upper wall portion 21 and the lower wall portion 22 are arranged so as to be spaced apart from each other in the vehicle height direction. A position of a front end of the upper wall portion 21 and a position of a front end of the lower wall portion 22 are flush with each other in the vehicle front-and-rear direction. On the other hand, a rear end of the upper wall portion 21 is positioned slightly rearward of a rear end of the lower wall portion 22.

Further, the body section 20 includes a front wall portion 23 formed so as to extend downward from the front end of the upper wall portion 21 and connected to the front end of the lower wall portion 22. Further, the body section 20 includes an upper rear wall portion 24 formed so as to extend downward from the rear end of the upper wall portion 21. A lower end of the upper rear wall portion 24 is positioned between the upper wall portion 21 and the lower wall portion 22. Further, the body section 20 includes a lower rear wall portion 25 formed so as to extend downward and forward from the lower end of the upper rear wall portion 24 and connected to the rear end of the lower wall portion 22.

Further, a rib R is formed in a space surrounded by the upper wall portion 21, the lower wall portion 22, the front wall portion 23, the upper rear wall portion 24, and the lower rear wall portion 25. The rib R is formed so as to extend forward from a connection portion between the upper rear wall portion 24 and the lower rear wall portion 25 and connected to the front wall portion 23. Two through-holes H1 are formed in each end portion of each of the upper rear wall portion 24 and the lower rear wall portion 25 in the vehicle width direction. The two through-holes H1 pass through the upper rear wall portion 24 or the lower rear wall portion 25 in the vehicle front-and-rear direction. The two through-holes H1 formed in the upper rear wall portion 24 are spaced apart from each other in the vehicle width direction, and also the two through-holes H11 formed in the lower rear wall portion 25 are spaced apart from each other in the vehicle width direction. Further, four through-holes H2 are formed in each end portion of the front wall portion 23 in the vehicle width direction. The four through-holes H2 pass through the front wall portion 23 in the vehicle front-and-rear direction. Axes of the through-holes H1 and axes of the through-holes H2 are aligned with each other. Hole diameters of the through-holes H1 and the through-holes H2 are larger than a size of a profile of a head portion of the bolt for fastening the bumper reinforcement 10 to the side members SL, SR. Note that, regions positioned at both end portions of the front wall portion 23 in the vehicle width direction correspond to side surface portions opposed to the side members SL. SR according to the present disclosure.

The mounting sections 30, 30 are formed on both end portions of the body section 20 in the vehicle width direction (portions each formed into a straight shape along the vehicle width direction), respectively. Each mounting section 30 is formed in a protruding manner forward from the front wall portion 23 of the body section 20. The mounting section 30 is formed into a tubular shape extending in the vehicle width direction. A cross-sectional profile of the mounting section 30 taken along a direction perpendicular to the vehicle width direction exhibits substantially a rectangular shape. The mounting section 30 includes an upper wall portion 31 formed so as to extend forward from an upper end portion of the front wall portion 23, and a lower wall portion 32 formed so as to extend forward from a lower end portion of the front wall portion 23. A position of a front end of the upper wall portion 31 and a position of a front end of the lower wall portion 32 are flush with each other in the vehicle front-and-rear direction. Further, the mounting section 30 includes a front wall portion 33 formed so as to extend downward from the front end of the upper wall portion 31 and connected to the front end of the lower wall portion 32. In other words, the mounting section 30 is formed into a tubular shape surrounded by the front wall portion 23, the upper wall portion 31, the lower wall portion 32, and the front wall portion 33. A front surface of the front wall portion 33 (that is, a surface opposed to the side member SL side or the side member SR side) is formed into a flat surface perpendicular to the vehicle front-and-rear direction. Further, four through-holes H3 are formed in each end portion of the front wall portion 33 in the vehicle width direction. The four through-holes H3 pass through the front wall portion 33 in the vehicle front-and-rear direction. Axes of the through-holes H3 are aligned with the axes of the through-holes H1 and the through-holes H2. A hole diameter of the through-holes H3 is slightly larger than an outer diameter of a screw portion of the bolt for fastening the bumper reinforcement 10 to the side members SL, SR, and is smaller than an outer diameter of the head portion of the bolt. Note that, lengths of the upper wall portion 31 and the lower wall portion 32 in the vehicle front-and-rear direction are set depending on a distance between rear ends of the side members SL, SR of the vehicle 1 and a rear end (bumper cover) of the vehicle 1. In other words, the mounting section 30 functions as a spacer between each of the side members SL, SR and the body section 20.

Figure 5:
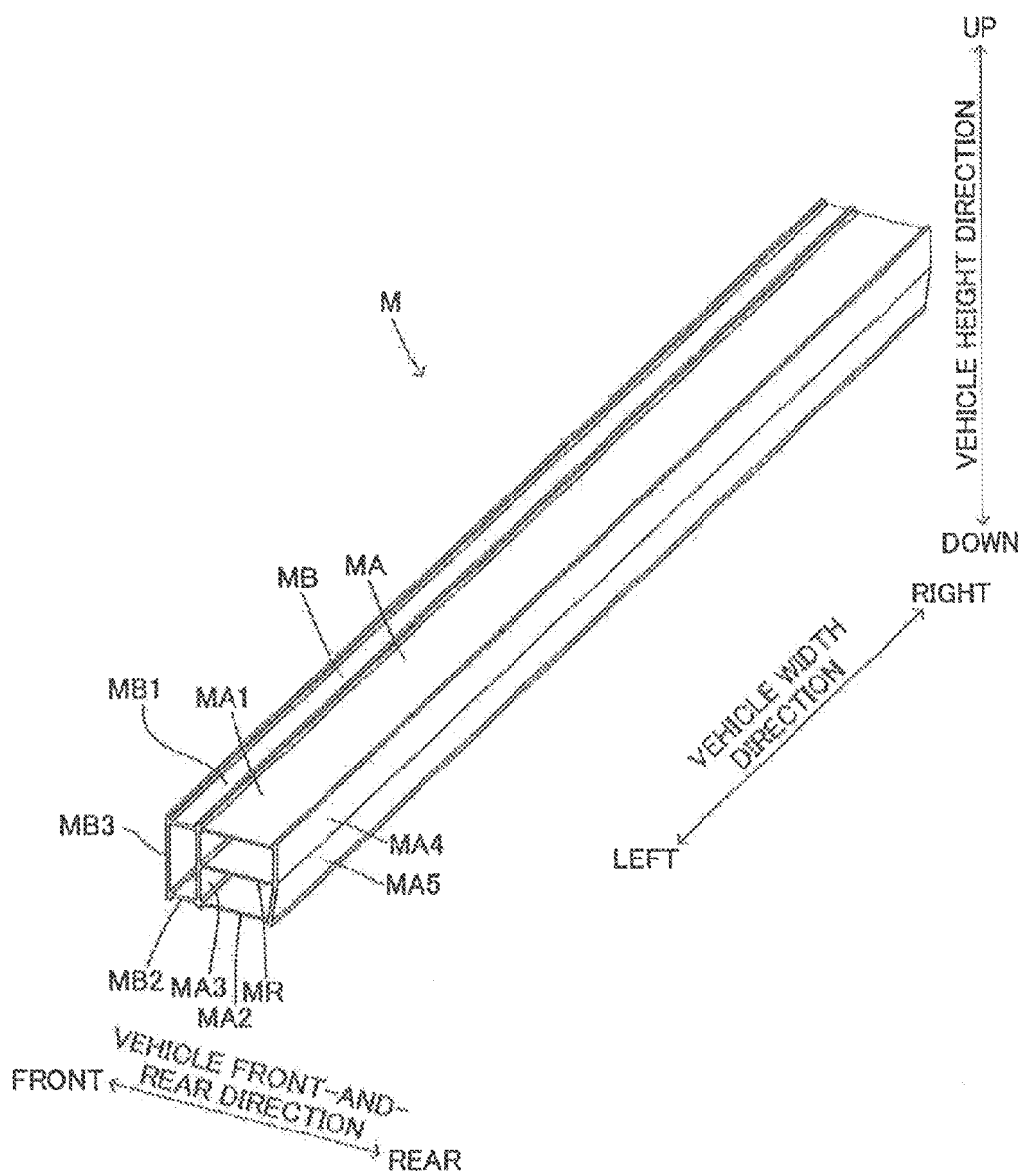
FIG. 5 is a perspective view illustrating an intermediate body.

The body section 20 and the mounting sections 30, 30 are formed integrally in the following manner. First, a metal material (such as an aluminum material) is extruded so as to be formed into an intermediate body M having a tubular shape and extending linearly as illustrated in FIG. 5. A cross-sectional shape of the intermediate body M taken along a direction perpendicular to the extending direction thereof exhibits the same shape as a cross-section of the end portion of the bumper reinforcement 10 in the vehicle width direction (see FIG. 4). That is, the intermediate body M includes a first tubular portion MA extending linearly, and a second tubular portion MB extending in the vehicle width direction in front of the first tubular portion MA. The first tubular portion MA includes wall portions MA1 to MA5 corresponding to the wall portions 21 to 25, respectively, and a rib MR corresponding to the rib R. The wall portions 21 to 25 and the rib R form the body section 20. The second tubular portion MB includes wall portions MB1 to MB3 respectively corresponding to the wall portions 31 to 33 that form the mounting section 30. Note that, a direction in which the metal material is extruded corresponds to the vehicle width direction. Next, under a state in which both end portions of the intermediate body M in the vehicle width direction are fixed, a center portion of the intermediate body M in the vehicle width direction is pressed rearward and curved. In order to firmly fix the intermediate body M in this process, a sufficiently large length in the vehicle width direction is ensured for a fixed part of each of the both end portions of the intermediate body M in the vehicle width direction. Specifically, the length in the vehicle width direction of the part fixed in this process is slightly larger than a length of each of the side members SL, SR in the vehicle width direction. Therefore, each end portion in the vehicle width direction of the intermediate body M subjected to this process exhibits a straight shape parallel to the vehicle width direction, and a length of the straight part in the vehicle width direction is slightly larger than the length of each of the side members SL, SR in the vehicle width direction.

Then, an intermediate portion (shadowed portion in FIG. 2) of the second tubular portion MB in the vehicle width direction is trimmed. Specifically, a part having a length in the vehicle width direction equal to the length of each of the side members SL, SR in the vehicle width direction is left on each end portion (specifically, each straight part) of the second tubular portion MB in the vehicle width direction, and portions except for the straight parts are trimmed. Note that, the wall portions MB1 to MB3 are trimmed, but the wall portion MA3 is not trimmed. In this manner, the mounting sections 30, 30 are formed at both end portions in the vehicle width direction, respectively. A length of each of the mounting sections 30, 30 in the vehicle width direction is equal to the length of each of the side members SL, SR in the vehicle width direction. That is, a length in the vehicle width direction of each end portion (portion extending linearly in the vehicle width direction) of the body section 20 in the vehicle width direction is slightly larger than the length of the mounting section 30 in the vehicle width direction. Thus, unnecessary portions are trimmed finally, and thus the bumper reinforcement 10 can be reduced in weight. Then, the through-holes H1 are formed in the upper rear wall portion 24 and the lower rear wall portion 25, and the through-holes H2 are formed in the front wall portion 23. Further, the through-holes H3 are formed in the front wall portion 33.

Next, description is made of procedures of mounting the bumper reinforcement 10 configured as described above to the side members SL, SR. First, under a state in which front surfaces of the mounting sections 30, 30 are brought into abutment against the rear wall portions of the side members SL, SR, respectively, the bolts are inserted into each mounting section 30 from the through-holes H1, H2. In addition, distal ends of the bolts are inserted into the through-holes H3, and the bolts are fastened to the nuts fitted into the rear wall portions of the side members SL, SR. In the above-mentioned manner, the bumper reinforcement 10 is mounted to the side members SL, SR.

As described above, in the bumper reinforcement 10, the body section 20 and the mounting sections 30, 30 are formed integrally. Therefore, as compared to a case where the mounting sections (bumper stays) and the body section (bumper reinforcement) are formed separately and fastened to each other as in the related-art bumper reinforcement, the number of the fastening portions between the components can be reduced. Thus, according to the bumper reinforcement 10, body rigidity of the vehicle can be increased. Further, the number of components can be reduced as compared to the related art. Further, the intermediate portion of the bumper reinforcement 10 in the vehicle width direction is formed so as to be curved along the bumper cover, and both end portions of the bumper reinforcement 10 in the vehicle width direction are each formed into a straight shape parallel to the vehicle width direction. Further, the rear end surface of each of the side members SL, SR is formed into a flat surface perpendicular to the vehicle front-and-rear direction, and also a front surface of the front wall portion 33 of each of the mounting sections 30, 30 is formed into a flat surface perpendicular to the vehicle front-and-rear direction. Therefore, the bumper reinforcement 10 is easily mounted to the rear end surfaces of the side members SL, SR.

In addition, the present disclosure may be carried out without being limited to the above-mentioned embodiment. Various modifications may be made without departing from the object of the present disclosure.

For example, a rib similar to the rib R formed in the body section 20 may be formed in each of the mounting sections 30, 30. Further, the number and an extending direction of the ribs in the body section 20 and the mounting sections 30, 30 can be set arbitrarily.

Further, when load is applied to the body section 20 toward a front of the vehicle, the mounting sections 30, 30 may be deformed so as to absorb shock caused at the time of application of the load. With this configuration, as compared to a case where a shock absorbing member for absorbing shock is separately mounted between the bumper reinforcement and a vehicle body, the number of the fastening portions between the components can be reduced. Accordingly, rigidity of the vehicle can be increased. Further, the number of components can be reduced.

The present disclosure has a feature in a bumper reinforcement (10) to be mounted to side members (SL, SR) arranged at both end portions of a vehicle in a vehicle width direction so as to extend in a vehicle front-and-rear direction, the bumper reinforcement (10) including: a body section (20) formed into a tubular shape so as to extend in the vehicle width direction of the vehicle, the body section (20) having both end portions in the vehicle width direction, which are formed so as to extend in the vehicle width direction, and an intermediate portion in the vehicle width direction, which is formed in a protruding manner toward one of a front of the vehicle and a rear of the vehicle; and a mounting section (30) to be mounted to one of a front end surface and a rear end surface of each of the side members, the mounting section (30) being formed into a tubular shape extending in the vehicle width direction integrally with a side surface portion of each of the both end portions of the body section in the vehicle width direction, the side surface portion being opposed to the each of the side members.

In this case, it is preferred that the body section and the mounting section be formed of an intermediate body (M) obtained by extruding a metal material so as to extend linearly in the vehicle width direction, the intermediate body including: a first tubular portion (MA) formed so as to extend in the vehicle width direction; and a second tubular portion (MB) formed so as to extend along the first tubular portion, and that the body section and the mounting section be formed by protruding an intermediate portion of the intermediate body in the vehicle width direction toward the one of the front of the vehicle and the rear of the vehicle, and then cutting off an intermediate portion of the second tubular portion in the vehicle width direction In this case, it is preferred that the intermediate portion of the body section in the vehicle width direction be formed so as to be curved in a protruding manner toward the one of the front of the vehicle and the rear of the vehicle. For example, it is preferred that the intermediate portion of the body section in the vehicle width direction be formed so as to be curved in a protruding manner toward the one of the front of the vehicle and the rear of the vehicle along a bumper cover.

In this case, it is preferred that the intermediate portion of the intermediate body in the vehicle width direction be curved in a protruding manner toward the one of the front of the vehicle and the rear of the vehicle.

In the bumper reinforcement according to the one embodiment of the present disclosure, the body section and the mounting section are formed integrally. Therefore, as compared to a case where the mounting section (bumper stay) and the body section (bumper reinforcement) are formed separately and fastened to each other as in the related-art bumper reinforcement, the number of the fastening portions between the components can be reduced. Thus, according to the bumper reinforcement according to the one embodiment of the present disclosure, body rigidity of the vehicle can be increased. Further, the number of components can be reduced as compared to the related art.

Further, the present disclosure has another feature in that the mounting section is formed into a straight shape extending in parallel to the vehicle width direction. In this case, it is preferred that, one of wall portions forming the mounting section, that is, a wall portion (33) opposed to the each of the side members have a surface on the side member side formed into a flat surface perpendicular to the vehicle front-and-rear direction. With this configuration, in a case where the front end surface or the rear end surface of the side member is formed into a flat surface perpendicular to the vehicle front-and-rear direction, the bumper reinforcement is easily mounted to the front end surface or the rear end surface of the side member.

What is claimed is:

1. A bumper reinforcement to be mounted to side members arranged at both end portions of a vehicle in a vehicle width direction so as to extend in a vehicle front-and-rear direction, the bumper reinforcement comprising:
    a body section formed into a tubular shape so as to extend in the vehicle width direction of the vehicle, the body section having both end portions in the vehicle width direction, which are formed so as to extend in the vehicle width direction, and an intermediate portion in the vehicle width direction, which is formed in a protruding manner toward one of a front of the vehicle and a rear of the vehicle; and
    a mounting section to be mounted to one of a front end surface and a rear end surface of each of the side members, the mounting section being formed into a tubular shape extending in the vehicle width direction integrally with a side surface portion of each of the both end portions of the body section in the vehicle width direction, the side surface portion being opposed to the each of the side members, wherein the body section and the mounting section are formed by protruding an intermediate portion of an intermediate body in the vehicle width direction toward the one of the front of the vehicle and the rear of the vehicle and then cutting off an intermediate portion of a second tubular portion in the vehicle width direction, the intermediate body being obtained by extruding a metal material so as to extend linearly in the vehicle width direction, the intermediate body comprising
        a first tubular portion formed so as to extend in the vehicle width direction; and
        the second tubular portion formed so as to extend along the first tubular portion.

2. A bumper reinforcement according to claim 1, wherein the mounting section is formed into a straight shape extending in parallel to the vehicle width direction.

3. A bumper reinforcement according to claim 1, wherein the intermediate portion of the intermediate body in the vehicle width direction is curved in a protruding manner toward the one of the front of the vehicle and the rear of the vehicle.

4. A bumper reinforcement according to claim 2, wherein the intermediate portion of the intermediate body in the vehicle width direction is curved in a protruding manner toward the one of the front of the vehicle and the rear of the vehicle.

* * * * *